United States Patent Office 3,594,363
Patented July 20, 1971

3,594,363
DIAZO DYES FOR NYLON
Hans Alfred Stingl, Brookside Heights, Toms River, N.J., assignor to Toms River Chemical Corporation, Toms River, N.J.
No Drawing. Filed July 10, 1968, Ser. No. 743,630
Int. Cl. D09b 31/12; D06p 1/02
U.S. Cl. 260—186
6 Claims

ABSTRACT OF THE DISCLOSURE

Compounds of the formula

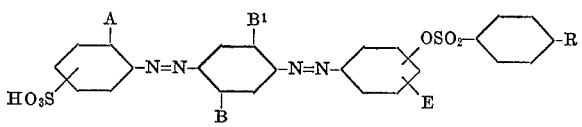

wherein A is hydrogen, lower alkyl such as methyl, ethyl or propyl, lower alkoxy such as methoxy, ethoxy or butoxy, or chlorine; B and $B^1$ are hydrogen, lower alkyl such as methyl, ethyl or butyl, or lower alkoxy such as methoxy, ethoxy or butoxy; E is hydrogen, lower alkyl such as methyl, ethyl or butyl, or lower alkoxy such as methoxy, ethoxy or butoxy; R is hydrogen, methyl or chlorine and

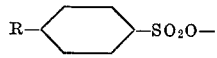

is either ortho or para to the azo linkage; and $SO_3H$ is either meta or para to the azo linkage, provide yellow to scarlet shades of good fastness and dyeing properties and excellent leveling characteristics on natural and synthetic polyamide fibers.

BACKGROUND OF THE INVENTION

The use of monoazo-dyestuffs containing a sulfonic acid group for the dyeing of animal fibers and artificial fibers of superpolyamides or superpolyurethanes is known. However, the dyeing of nylon presents particular problems in obtaining good leveling and the achievement of optimum leveling is a very important consideration in the dyeing or printing of nylon in order to cover up irregularities.

SUMMARY OF THE INVENTION

The present invention relates to and has for its objects the provision of dyestuffs particularly suited for the coloring of nylon fibers.

In accordance with the present invention it has been found that valuable dyeings are obtained on natural and synthetic polyamide fibers by the use as dyestuffs of disazo compounds of the formula

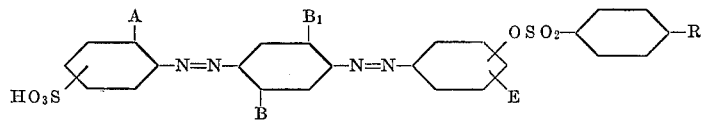

wherein A is hydrogen, lower alkyl such as methyl, ethyl or propyl, lower alkoxy such as methoxy, ethoxy or butoxy, or chlorine; B and $B^1$ are hydrogen, lower alkyl such as methyl, ethyl or butyl, or lower alkoxy such as methoxy, ethoxy or butoxy; E is hydrogen, lower alkyl such as methyl, ethyl or butyl, or lower alkoxy such as methoxy, ethoxy or butoxy; R is hydrogen, methyl or chlorine and

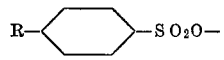

is either ortho or para to the azo linkage; and $SO_3H$ is either meta or para to the azo linkage.

The compounds of the present invention are prepared according to known procedures by diazotizing unsubstituted or properly ring-substituted metanilic or sulfanilic acids, coupling the diazotized compound with an arylamine or its N-methane-sulfonic acid such as "aniline omega acid," following with an alkali treatment in case of N-methane-sulfonic acid, rediazotizing the p-aminoazo compound, coupling the rediazotized product with a phenolic compound such as phenol, cresol or methoxy-phenol, followed by benzenesulfonylation, such as tosylation, of the product to provide the novel dyestuff of the present invention.

The dyestuffs of the present invention can be employed in the form of their salts, for example, in the form of the ammonium or alkali metals, such as sodium, potassium or lithium salts.

The disazo-dyestuffs of the present invention can be used for dyeing or printing a very wide variety of materials, principally for dyeing animal fibers such as leather, silk and especially wood and for dyeing artificial fibers of superpolyamides or superpolyurethanes. The dyeings obtainable therewith are distinguished by the purity and brightness of their tints, by excellent properties of fastness to alkali, light and washing and by good leveling and transfer properties.

The dyes of the present invention show very good exhaustion from a neutral dye-bath and provide dyeings over a shade range from yellow to orange.

The dyes will also dye well in combination, especially with the use of a leveling agent. If desired, a conventional after-treatment can be given to the dyed material.

The following examples illustrate the invention.

EXAMPLE 1

(A) 17.3 grams of metanilic acid are dissolved in 70 grams of water by addition of 8 grams of 50% by weight caustic soda solution. Ice, 22 grams of concentrated hydrochloric acid, and a solution of 7 grams of sodium nitrite in 20 grams of water are added to achieve diazotization at 0–3° C.

(B) 15.3 grams of 2,5-dimethoxyaniline, dissolved at 45° C. in 120 grams of water and 11 grams of concentrated hydrochloric acid, are combined with the diazotized metanilic acid and enough ice to keep the temperature below 5° C. and the pH is raised to 2.5 with 20% soda ash solution. After completion of the coupling, the product is dissolved at pH 9 with 50% caustic soda solution and then salted with 50 grams of sodium chloride. Rediazotization is accomplished by addition of 7.5 grams of sodium nitrite followed by an aqueous solution of 21 grams of naphthalene-sulfonic acid and sufficient sulfuric acid to establish a congo acid reaction. A temperature of 32° C. is maintained for 2 hours.

(C) This reaction mass is added during one hour to a solution of 9.4 grams of phenol, 3 grams of caustic soda, and 25 grams of soda ash in 200 grams of water while the temperature is held below 5° C. by addition of ice.

The resulting slurry is stirred for 2 hours, neutralized with hydrochloric acid, and filtered.

(D) The filter cake is dissolved in 500 grams of water at 80° C., containing 4 grams of caustic soda and 5 grams of soda ash. 20 grams of crushed p-toluenesulfochloride are added and the thickening reaction mass is stirred for 30 minutes at 80–85° C. The pH is raised to 10 with caustic soda and the product is isolated by filtration. The filter cake is washed with 1% brine and dried to give a product of the formula

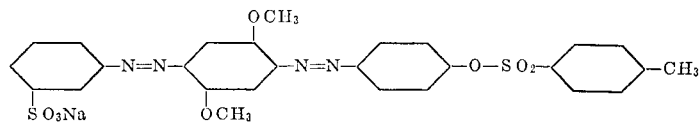

The product dyes nylon from neutral or weakly acid dye baths bright orange shades of good light and wash fastness properties.

EXAMPLE 2

The procedure of Example 1 is repeated replacing the phenol in Example 1 with 12.4 grams of meta-methoxyphenol, yielding a product of the structure:

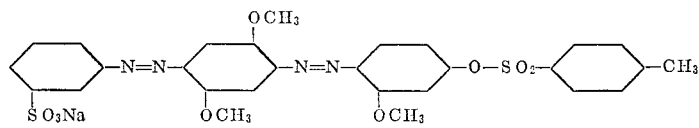

The product dyes nylon reddish-orange shades of good light and wash fastness.

EXAMPLE 3

17.3 grams by weight of metanilic acid are diazotized by the procedure of Example 1A.

13.7 grams of 2-methoxy-5-methylaniline, dissolved at 45° C. in 120 grams of water and 11 grams of concentrated hydrochloric acid are combined with the diazotized metanilic acid and enough ice to keep the temperature below 5° C. The pH is then gradually raised to 3.0 with 20% soda ash solution. The coupling product is filtered off the next morning and subsequently dissolved in 500 grams of water at 50° C. by addition of 8 grams of 50% by weight caustic soda solution. The solution is salted with 28 grams of sodium chloride and cooled to 20° C. 7.2 grams of sodium nitrite are added, followed by an aqueous solution of 21 grams of naphthalenesulfonic acid and sufficient sulfuric acid to establish a congo acid reaction. One hour later an amount of sodium chloride (in weight units) equivalent to 20% of the volume of the slurry is added and the slurry is cooled to 8° C.

The precipitate is collected by filtration, reslurried in 250 grams of cold water and added during one hour to a solution of 9.4 grams of phenol, 3 grams of caustic soda and 20 grams of soda ash in 200 grams of water while holding the temperature below 5° C. by addition of ice and maintaining a sandy form by addition of 70 grams of sodium chloride. Two hours later the coupling product is isolated by filtration.

Tosylation of the filter cake is carried out as described in Example 1D.

The product isolated has the formula

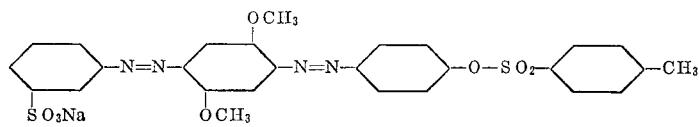

and dyes nylon clear level shades of yellow-orange of very good light and wash fastness.

EXAMPLE 4

17.3 grams of sulfanilic acid are diazotized in 50 grams of ice water and 11 grams of concentrated hydrochloric acid by the rapid addition of a concentrated solution of 7 grams of sodium nitrite in water at 0 to 8° C. The diazotized sulfanilic acid is combined with 13.7 grams of 2-methoxy-5-methylaniline as described in Example 3. The coupling product is acidified with hyrdochloric acid the next morning and isolated by filtration. The filter cake is dissolved at pH 8.0 in 250 grams of water at 50° C. with caustic soda. 10 grams of sodium naphthalenesulfonate and 7 grams of sodium nitrite are added. The total preparation is gradually added to 200 grams of cold water containing 45 grams of concentrated hydrochloric acid and stirred for one hour at 30° C. It is then added during one hour to a solution of 9.4 grams of phenol, 6 grams of caustic soda, and 25 grams of soda ash in 200 grams of water while the temperature is held below 5° C. by addition of ice. The resulting slurry is stirred for 2 hours, salted with 120 grams of sodium chloride, and filtered.

The filter cake is toslyated as described in Example 1D. The product obtained has the formula

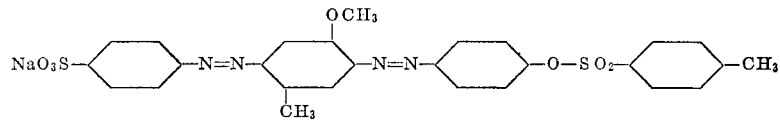

and dyes nylon yellow-orange shades of good light and wash fastness.

EXAMPLE 5

17.3 grams of metanilic acid are diazotized by the procedure of Example 1A. The pH of the resulting solution is then raised to 2.5 with sodium bicarbonate; 6.6 grams of sodium acetate are added, followed quickly by 22.5 grams of o-anisidyl-N-methanesulfonic acid while the temperature is held at 5–7° C. by adding ice and cold water. After stirring for one hour, 38 grams of 50% by weight caustic soda solution is added and the mass heated at 100° C. for 8 hours. It is then cooled, its pH reduced below 10.0 with 28 grams of sodium bicarbonate, salted with 33 grams of sodium chloride, and filtered.

The filter cake is dissolved neutral in 800 grams of water at 30° C. To the solution are added 7 grams of sodium nitrite followed by an aqueous solution of 21 grams of naphthalene-sulfonic acid and sufficient sulfuric acid to establish a congo acid reaction. A temperature of 32° C. is maintained for 2 hours. This reaction mass is combined with phenol as described in Example 1C. The tosylation procedure of Example 1D is followed with the isolated intermediate product. The product obtained has the formula

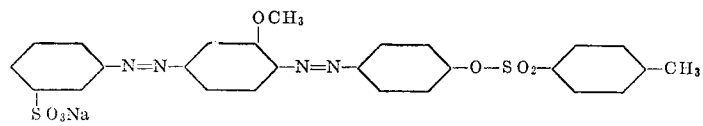

and dyes nylon bright reddish-yellow of very good light and wash fastness.

Following the procedure set forth in Example 1 and employing the appropriate end couplers, the following compounds providing reddish-orange shades of good light and wash fastness are obtained:

EXAMPLE 6

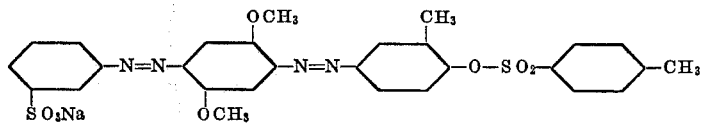

EXAMPLE 7

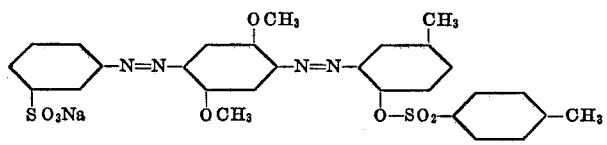

EXAMPLE 8

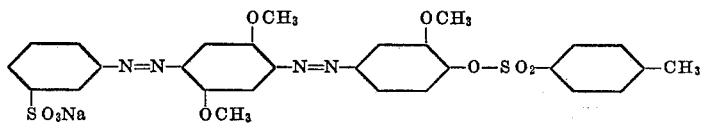

The following examples illustrate further—but by no means limit—the scope of this invention:

EXAMPLE 9

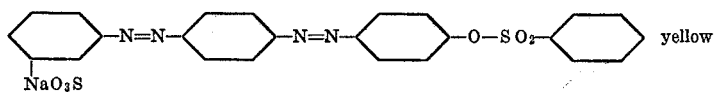 yellow

EXAMPLE 10

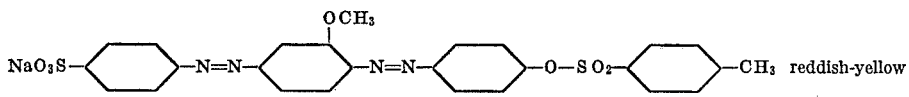 reddish-yellow

EXAMPLE 11

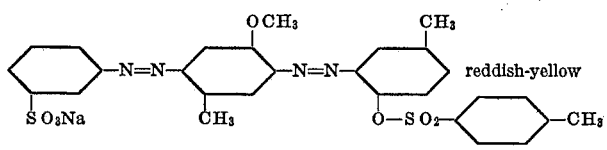 reddish-yellow

EXAMPLE 12

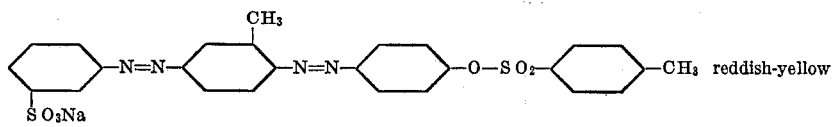 reddish-yellow

EXAMPLE 13

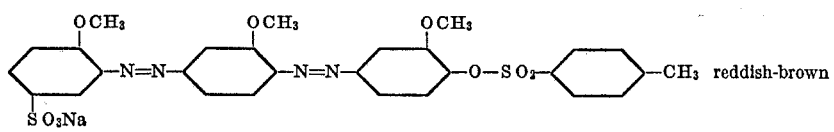 reddish-brown

EXAMPLE 14

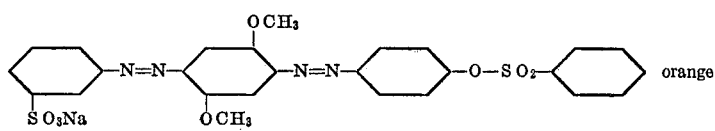 orange

EXAMPLE 15

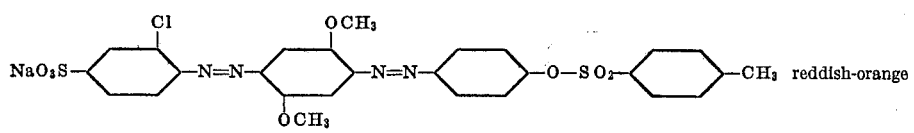 reddish-orange

EXAMPLE 16
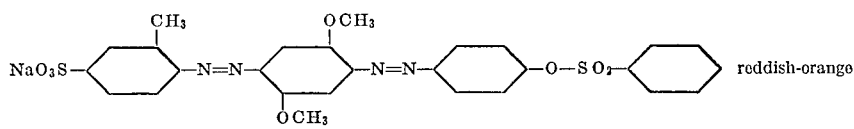 reddish-orange
EXAMPLE 17
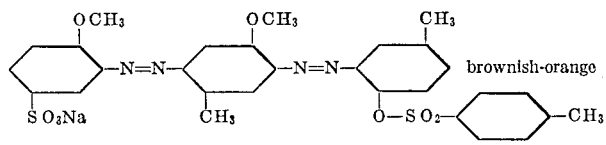 brownish-orange
EXAMPLE 18
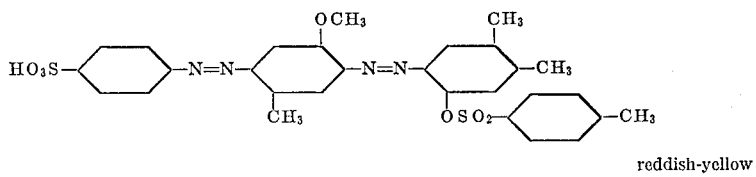 reddish-yellow
EXAMPLE 19
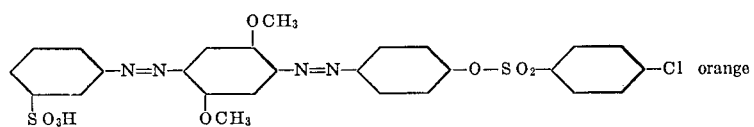 orange
EXAMPLE 20
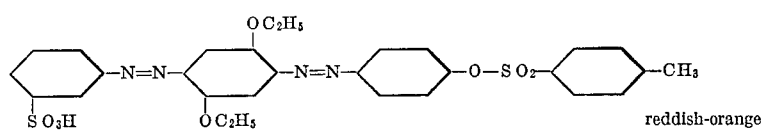 reddish-orange
EXAMPLE 21
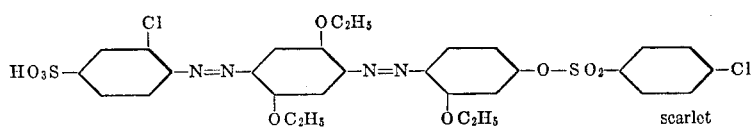 scarlet
EXAMPLE 22
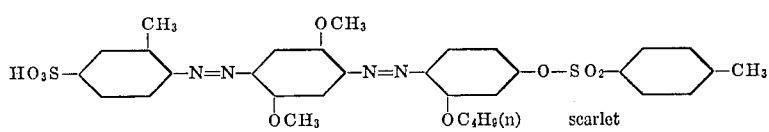 scarlet
EXAMPLE 23
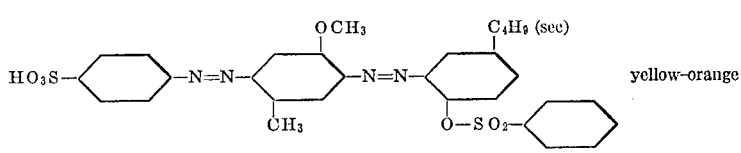 yellow-orange
EXAMPLE 24
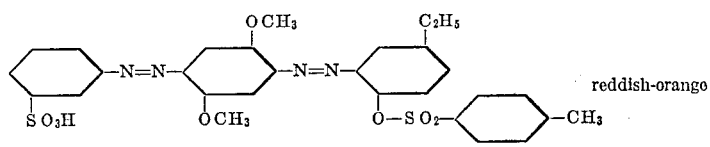 reddish-orange
What is claimed is:
1. A compound of the formula
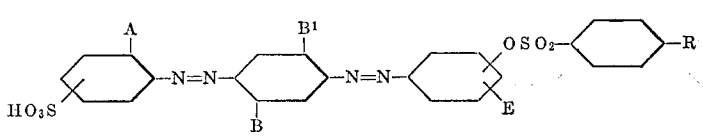

wherein A is hydrogen, lower alkyl, lower alkoxy or chlorine, B and B¹ are hydrogen, lower alkyl or lower alkoxy, E is hydrogen, lower alkyl or lower alkoxy, R is hydrogen, methyl or chlorine, the group

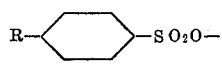

is ortho or para to the azo linkage and the group —SO₃H is meta or para to the azo linkage and their alkali metal and —NH₄ salt.

2. A compound according to claim 1 having the formula

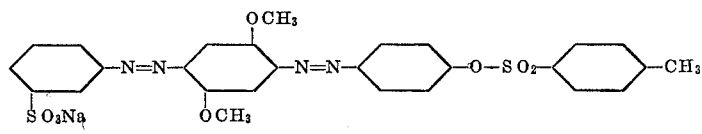

3. A compound according to claim 1 having the formula

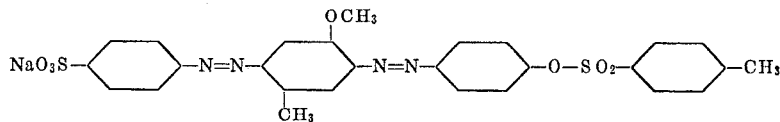

4. A compound according to claim 1 having the formula

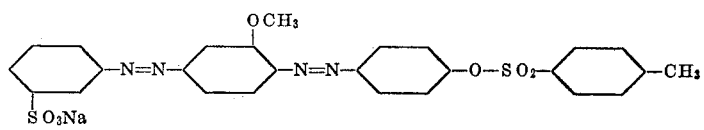

5. A compound according to claim 1 having the formula

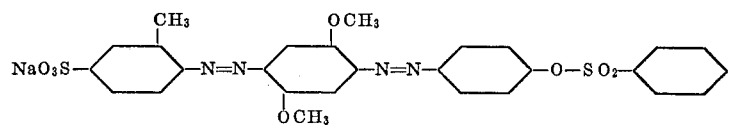

6. A compound according to claim 2 having the formula

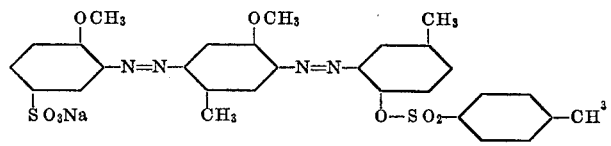

References Cited

UNITED STATES PATENTS 3,310,550  3/1967  Liechti _____ 260—186X

CHARLES B. PARKER, Primary Examiner

D. M. PAPUGA, Assistant Examiner

U.S. Cl. X.R.

8—54, 162, 178